UNITED STATES PATENT OFFICE.

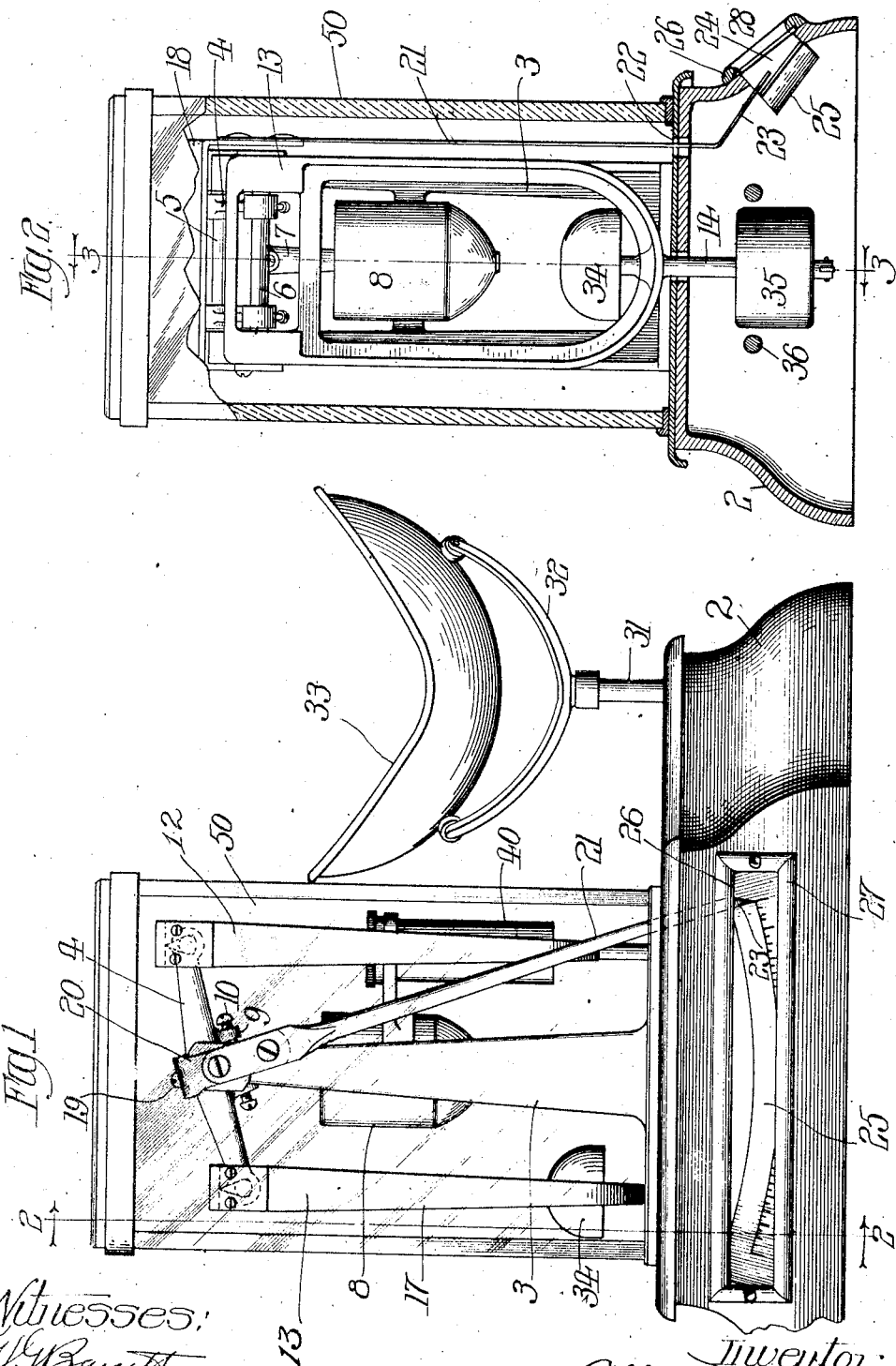

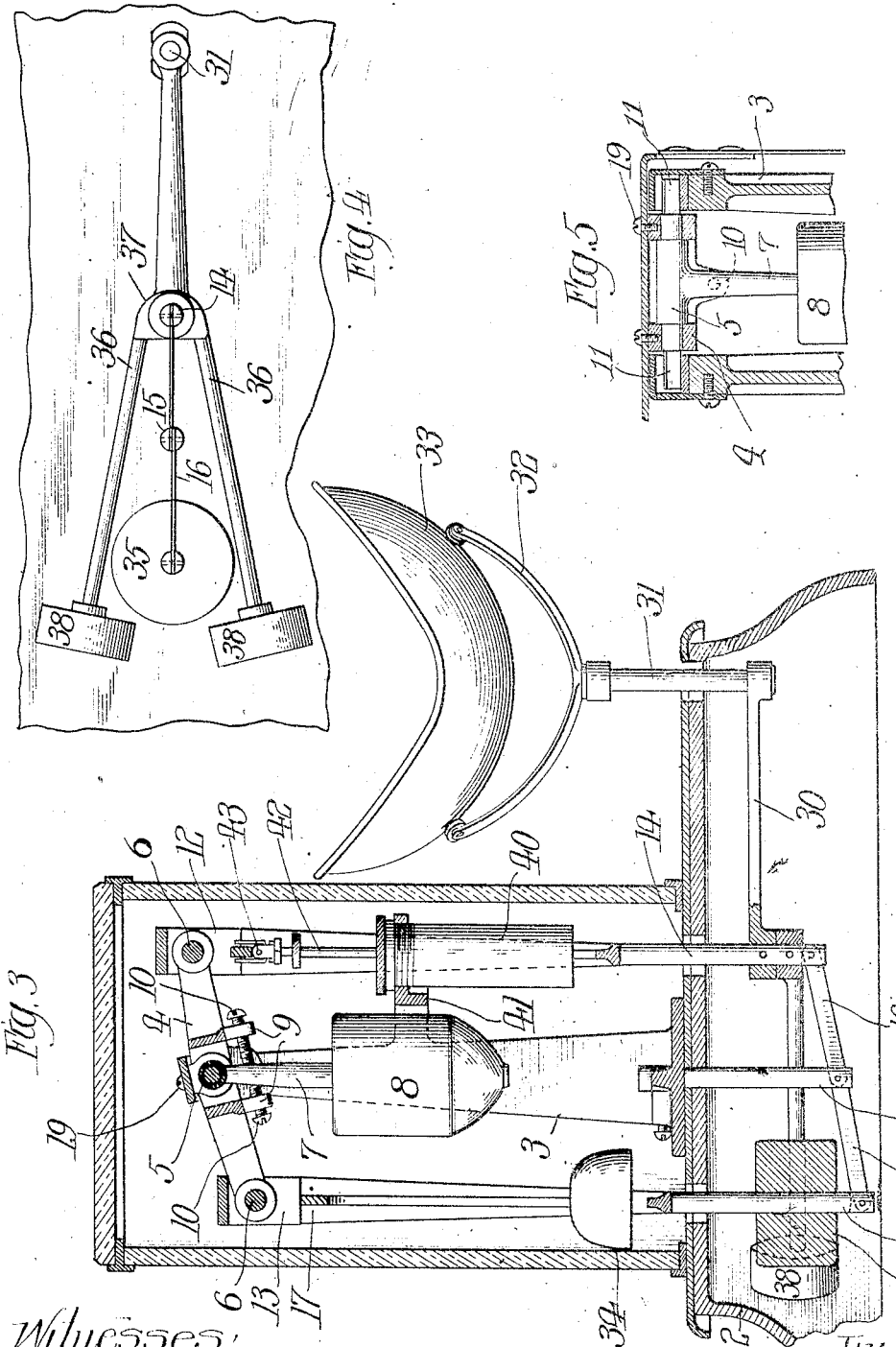

ALLEN DE VILBISS, JR., OF TOLEDO, OHIO, ASSIGNOR TO TOLEDO COMPUTING SCALE COMPANY, OF NEWARK, NEW JERSEY, A CORPORATION OF NEW JERSEY.

WEIGHING-SCALE.

1,007,932.        Specification of Letters Patent.        Patented Nov. 7, 1911.

Application filed June 21, 1907. Serial No. 380,125.

*To all whom it may concern:*

Be it known that I, ALLEN DE VILBISS, Jr., a citizen of the United States, residing at Toledo, in the county of Lucas and State of Ohio, have invented certain new and useful Improvements in Weighing-Scales, of which the following is a specification.

This invention relates more particularly to scales designed for the weighing of small articles and the invention aims to provide a construction which can be contained in a limited space and which is extremely sensitive so as to permit accurate weighing of small quantities.

It is also an object to arrange the scale-pan or platform conveniently at one side of the weighing and indicating apparatus.

To these ends the invention consists in certain novel features of construction and combinations of parts the essential elements of which are recited in the appended claims and a preferred form of embodiment of which is described in detail hereinafter and fully illustrated in the accompanying drawings.

Of said drawings Figure 1 represents the scales in front elevation; Fig. 2 represents the scales in left side elevation with the casing broken away and some parts omitted and in section on line 2—2 of Fig. 1; Fig. 3 is a vertical longitudinal section taken substantially on the line 3—3 of Fig. 2; Fig. 4 is a fragmentary bottom plan view; and Fig. 5 is a central vertical cross section of the upper part of the interior mechanism.

Upon a hollow base 2 there is erected a standard 3 composed of two upright members and a connecting base portion. The upper ends of these uprights are equipped with bearings for a walking beam 4 preferably formed as a frame comprising parallel side-arms and cross-pieces and central and end cross-rods 5 and 6. The cross-rod 5 constitutes a support for a pendulum comprising a rod or stem 7 secured to said cross-rod 5 and a weight 8 depending between the uprights of the standard 3. The cross-bars of the frame 4 have depending lips 9 tapped to receive screws 10 for adjusting the pendulum, said screws bearing against opposite sides of the latter's stem 7 as clearly shown in Fig. 3. The cross-rod 5 not only constitutes a support for the pendulum but supplies knife edge trunnions 11 as shown in Fig. 5 for engagement with the bearings of the standard 3. When the scales are in use the pendulum will have no movement relatively to the walking beam, the screws 10 being adjusted to prevent any such movement. Thus the pendulum and the walking beam will rock as one integral structure upon the bearings which the knife edges 11 engage as already described.

The end cross-rods 6 of the walking beam frame have projecting knife edges as indicated by dotted lines in Fig. 1, these edges being upturned for the engagement therewith of bearings in arms 12 and 13 of yoke form as shown in Fig. 2. These arms have portions extending over the cross-rods 6 from end to end thereof as shown in Fig. 2, the sides of the yokes being preferably united also below said cross-rods. From the lower end of each yoke there depends a stem 14 through a suitable slot in the hollow base 2. Within the latter there depends a fixed post 15 centrally located with reference to the yoke stems 14 and the latter are connected by links 16 of equal length to said fixed post 15 as clearly shown in Fig. 3. The latter is in vertical alinement with the axis of the walking beam 4 and it will be perceived that a parallelogram construction is provided by the above-described parts. While two separate links 16 are shown, it will be obvious that a single link would suffice as of course the two links always remain in line.

A strap 18 secured across the top of the walking beam frame, preferably by screws 19 entering the portions of said frame which surround the central cross-rod 5, has a downturned front portion 20 to which there is secured a pointer 21. The top of the hollow base 2 is slotted as shown at 22 in Fig. 2 for the passage of said pointer. The latter has a terminal portion 23 extending at an angle to its main portion and overlying a table 24 of weight graduations. This table is arranged upon a plate 25 suitably supported within the hollow base 2 behind a longitudinal sight-opening 26 therein. The plate 25 is curved in the arc of a circle to accommodate the sweep of the bent end of the pointer and is likewise inclined so as to show clearly through the sight-opening. The latter is preferably surrounded by a frame 27 which confines the glass 28 in place.

As here shown the table of weight graduations runs from right to left and consequently when the scales are normal the pointer is swung to the right as shown in Fig. 1. This pointer extends at right angles to the walking beam 4 so that normally the latter is at an inclination but the pendulum hangs straight down being properly adjusted by screws 10. It will thus be apparent that when weighing an article the right-hand portion of the parallelogram structure heretofore described must be depressed and the left-hand portion correspondingly elevated.

To the depending stem of the yoke 12 there is secured within the hollow base 2 a horizontally extending arm 30 which projects away from the parallelogram structure and at its extremity supports an upright rod or stem 31, the latter projecting through a slot in the top of the hollow base 2 and carrying above it curved branching arms 32 designed to support a scale-pan 33. It will be seen that the weight of anything placed in this scale-pan will thus tend to depress the right-hand portion of the parallelogram structure.

In order to counterbalance normal weight on the right-hand side of the axis of the walking beam 4 including the weight of the scale-pan and its immediate support, a weight 34 is mounted in the yoke 13 and a weight 35 is secured to the stem 14 of said yoke. In order to individually counterbalance the scale-pan and its support in the matter of leverage due to the mounting of the scale-pan on the extremity of the horizontally projecting arm 30 and consequent tendency to thrust the stem 14 of the yoke 12 to the left, a pair of diverging arms 36 are secured by a suitable boss 37 to said yoke stem and weights 38 are mounted upon the outer ends of said arms.

In order to steady the movements of the parts in weighing and prevent undue vibration of the pointer 21 a dash-pot is employed whose cylinder 40 is fixedly secured in a bracket 41 projecting from the standard 3 as shown in Fig. 3, the said cylinder being preferably screw-threaded to engage a tapped opening in said bracket. The piston rod 42 of the dash-pot is connected through a knuckle joint 43 with the lower cross-bar of the yoke 12.

The weighing apparatus above the hollow base 2 is preferably inclosed in a glass casing 50 and the scale-pan 33 is closely adjacent to this casing thus giving it a convenient location and keeping the scales compact.

What is claimed is:

1. A scale comprising a hollow base, a working beam mounted thereon, an arm depending from the working beam and connected by links to a stationary part beneath the base, a lateral projection on one of the arms within the base, a support for a scale pan on said projection, and means for counterbalancing the projection and scale pan also mounted upon said arm.

2. In weighing scales, the combination of an overhead beam, load-counterbalancing means connected with said beam, indicating means connected with said beam, an arm suspended from the outer end of the beam, a link jointed at one end to the lower end of said arm, a fixed support for the link, a scale-pan or platform supported by said arm laterally removed therefrom, and an individual counterbalance for said scale-pan.

3. In weighing scales, the combination of an overhead beam, load-counterbalancing means connected with said beam, indicating means connected with said beam, an arm suspended from the outer end of the beam, a link jointed at one end to the lower end of said arm, a fixed support for the link, a scale-pan or platform supported by said arm laterally removed therefrom, means for counterbalancing the arm, link and scale-pan, and means for individually counterbalancing the scale-pan.

4. In weighing scales, the combination of a walking beam, load-counterbalancing means connected with said beam, a pointer carried by said beam, arms suspended from opposite ends of the beam, a fixed central support to which said arms are linked at their lower ends, a scale-pan or platform carried by one of said arms to one side of the parallelogram structure of which it forms a part, and an individual counterbalance for said scale-pan.

5. In weighing scales, the combination of a walking beam, load-counterbalancing means connected with said beam, a pointer carried by said beam, arms suspended from opposite ends of the beam, a fixed central support to which said arms are linked at their lower ends, a scale-pan or platform carried by one of said arms to one side of the parallelogram structure of which it forms a part, a counterbalancing weight carried by the other arm, and an individual counterbalance for the scale-pan.

6. In weighing scales, the combination of a walking beam, a pendulum suspended centrally therefrom, a pointer carried by said beam, arms suspended from opposite ends of the beam, a fixed central support to which said arms are linked at their lower ends, a scale-pan or platform carried by one of said arms to one side of the parallelogram structure of which it forms a part, and a dash-pot connected with that arm.

7. In weighing scales, the combination of a walking beam, a pendulum suspended centrally therefrom, a pointer carried by said beam, arms suspended from opposite ends of the beam, a fixed central support to which said arms are linked at their lower ends, a lateral projection on one of said arms, a scale-pan or platform mounted on said lateral projection, a counterbalancing weight carried by the other of said arms, and a weighted lateral projection on the first specified arm extending oppositely to the projection which carries the scale-pan.

8. In weighing scales, the combination of a duplex standard, a walking beam fulcrumed between the upper ends of the members of said standard, a depending pointer carried by the middle portion of said beam, a support having a table of weight graduations over which said pointer extends, yoke-form arms suspended from opposite ends of the beam and having downward extensions, a fixed central support to which the latter are linked, a pendulum suspended from the middle of the beam, a lateral projection on one of the arms, a scale-pan or platform mounted on said projection, a dash-pot the cylinder of which is fixedly supported within the yoke-form portion of said arm and the piston rod of which is connected with the latter, a counterbalancing weight carried by the other arm, and a lateral projection on the first specified arm, extending oppositely to the projection which carries the scale-pan and weighted to counterbalance the latter.

9. In a weighing scale, a frame, a beam pivotally mounted in the frame and carrying knife edges at its opposite ends, yoke arms depending from the knife edges, links connecting the lower ends of the arms to a part of the frame, a scale pan connected to but offset from one of the depending arms and a counterbalance therefor secured within the yoke of the other arm.

10. In a weighing scale, the combination of a frame, a beam pivotally supported therein and having knife edges at its opposite ends, yoke arms suspended from the knife edges, links connecting the arms at the lower ends to the frame, a bracket projecting from the frame within one of the yokes, a dash-pot supported by the bracket, a piston within the dash-pot and connected to the adjacent depending arm, a goods receiver connected to one of the arms, an invariable counterbalance connected to the other, and a pendulum rigidly connected to the beam.

11. In a weighing scale, a frame comprising the supports 3, a cross rod having knife edges resting on the supports, a pendulum connected to the cross rod, a scale beam mounted upon the cross rod and angularly adjustable with relation thereto and to the pendulum, means for adjusting the beam with relation to the cross rod and the pendulum and a goods receiver connected to the beam.

ALLEN DE VILBISS, Jr.

Witnesses:
M. L. Thompson,
E. E. Loomis.